Aug. 19, 1969         W. S. SHORE         3,462,061
SELF-SUPPORTING PLASTIC CONTAINER
Filed July 29, 1968

INVENTOR
WILLIAM S. SHORE
BY
Roy Davis
ATTORNEY.

United States Patent Office 3,462,061
Patented Aug. 19, 1969

3,462,061
SELF-SUPPORTING PLASTIC CONTAINER
William S. Shore, Cleveland, Ohio, assignor to Diamond Shamrock Corporation, Cleveland, Ohio, a corporation of Delaware
Continuation-in-part of application Ser. No. 654,241, July 18, 1967, which is a continuation-in-part of application Ser. No. 567,935, July 26, 1966. This application July 29, 1968, Ser. No. 748,457
Int. Cl. B65d 5/00, 1/22, 39/00, 83/00
U.S. Cl. 229—7                                6 Claims

ABSTRACT OF THE DISCLOSURE

The disclosure is directed to a thin-walled, self-supporting container formed of plastic film or sheet. The body of the container is of generally tubular form and is generally polygonal in cross section. The intersections of the generally polygonal side walls are provided with external tubes to provide rigidity for the upright body portion. One of the external tubes is adapted to function as an integral straw.

CROSS REFERENCE TO RELATED APPLICATIONS

This application is a continuation-in-part of U.S. application Ser. No. 654,241, filed July 18, 1967, which is a continuation-in-part of U.S. application Ser. No. 567,935, filed July 26, 1966 and now abandoned.

BACKGROUND OF THE INVENTION

The invention relates to self-supporting, upright containers and especially to sealed containers used to package liquids, such as milk and other food products. More particularly, the invention relates to containers formed of plastic sheet or film having a thickness of 10 mils or less, wherein a drinking tube or straw means are provided integral with the container. While plastic containers for packaging milk, fruit juices and other liquid food products are well known, such plastic containers are usually molded by blow molding, or other molding techniques well known in the art. In the above mentioned applications, methods are disclosed for forming containers from relatively thin plastic sheet or film. In the second mentioned application, containers of thin film having internal reinforcing rods or tubes and bulge controlling transverse seals are disclosed.

Containers according to the subject invention constitute a further improvement over the above mentioned containers in that they exhibit improved top loading capabilities and provide means for drinking the contents through an integral straw.

SUMMARY OF THE INVENTION

It is among the objects of the invention to provide an improved self-supporting container having an integral straw and fabricated from relatively thin, plastic sheet or film such as high density polyethylene.

Another object of the invention is to provide improved self-supporting liquid-tight containers having integral straws, which containers are partly fabricated as flat strips in continuous lengths that may be rolled or folded and then shipped to and stored at a packaging facility where their fabrication is completed.

Still another object is to provide a thin-walled container of plastic sheet or film having an external reinforcing frame which makes the container capable of top loading and provides an integral straw.

The article embodying this invention is a thin-walled container formed of plastic sheet or film and including an upright tubular body portion having generally polygonal side panels and a generally polygonal transverse cross section.

The plastic material is preferably high density polyethylene having a density of from 0.941 to 0.965. For the purposes of these containers, the thickness of the plastic film or sheet is preferably about three to ten mils. Plastic means provide rigidity for the body portion at the intersection of the side panels and one such means functions as an integral straw. The means includes at each intersection, two adjacent portions of the plastic film or sheet adhered to one another to form an integral external rib and a plastic tubular integrally formed reinforcing member. One of such tubular members is an integral straw.

According to one embodiment of the container, the side panels are generally rectangular and the body portion has a generally rectangular cross-section.

BRIEF DESCRIPTION OF THE DRAWING

The above and various other objects, features and advantages of this invention will be more clearly understood from a reading of the detailed description of the invention in conjunction with the drawing in which.

DESCRIPTION OF THE PREFERRED EMBODIMENT

Figure 1:
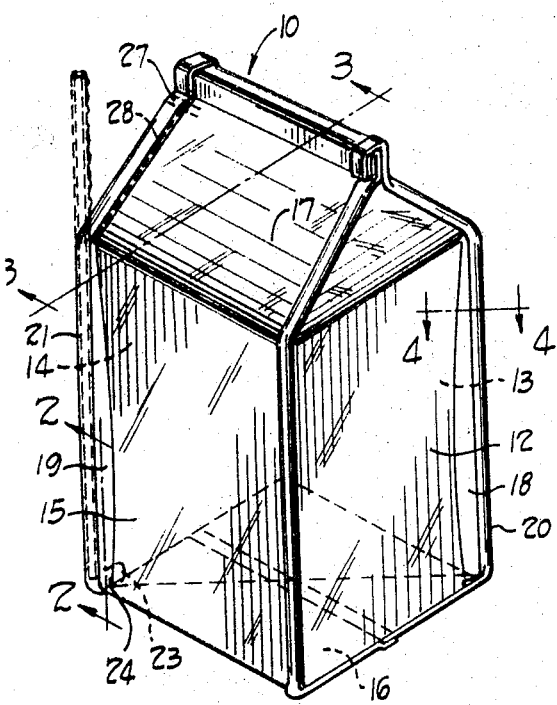
FIGURE 1 is a perspective view of one illustrative embodiment of a container according to this invention.
Figure 4:
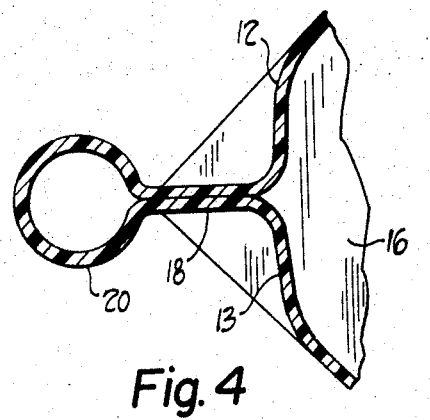
FIGURE 4 is a cross-sectional view taken along the plane of line 4—4 of FIGURE 1 and to an enlarged scale.

Referring now to the drawings, one embodiment of plastic container 10 is shown in perspective in FIGURE 1, and fragments of the container 10 are shown in FIGURES 2, 3, 4 and 5. The container 10 is shown having relative dimensions comparable to that of a pint container. However, containers according to this invention will usually be formed in half-pint size. It should be understood that other size containers may be formed according to this invention. The container includes side walls 12, 13, 14 and 15, a bottom 16 and a top portion 17. The container 10 is preferably formed from a tube or sheet of high density polyethylene having a thickness of at least 3 mils and preferably in the range of 4 to 10 mils. This plastic is merely by way of example, but is preferable because of its wide temperature range, relatively high stiffness, yield, good general machining performance, printability, heat-sealing and non-heat shrinking properties. It should be understood that other thermoplastics such as polypropylene and polyvinylchloride may also be used with equal facility in this invention. While thermoplastics are preferred for this container, it should be understood that any other material that lends itself to post operational plastic forming may also be used.

Sidewalls 12 and 13 have adhering portions which define a reinforcing rib 18. Similarly, sidewalls 14 and 15 have adhering portions which define a reinforcing rib 19. Only two reinforcing ribs are shown in FIGURE 1, it being understood that the other corners of the container are provided with similar reinforcing ribs. These ribs are formed by adhering adjacent, narrow, superimposed, longitudinal portions of a tubular length of plastic sheet or film at eight perimetrically spaced areas to form the four integral, external ribs such as ribs 18 and 19. These adjacent portions may be adhered by passing the tubular length of plastic between the edges of heated knives or bars. They may also be joined by any conventional sealing means. These adjacent portions are of such length that upon formation of an external rib such as 18 or 19, a tubular member such as member 20 is formed external to and integral with rib 18, and a tubular member 21 is formed external to and integral with rib 19. These tubular members are generally hollow and are substantially coextensive with external reinforcing ribs such as 18, 19. These tubular members such as 20, 21 provide added reinforcement for the container 10. In the formation of one rib such as 19, and the associated tubular member 21, portions 23, 24 of adjacent sidewalls 14, 15, respectively, are not heat-sealed in order that means may be provided for fluid passage 25 between tubular member 21 and the interior of container 10.

Figure 2:
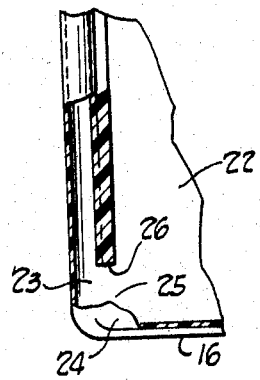
FIGURE 2 is a fragmentary view in elevation of the container of FIGURE 1 to an enlarged scale and taken along the line 2—2.
Figure 3:
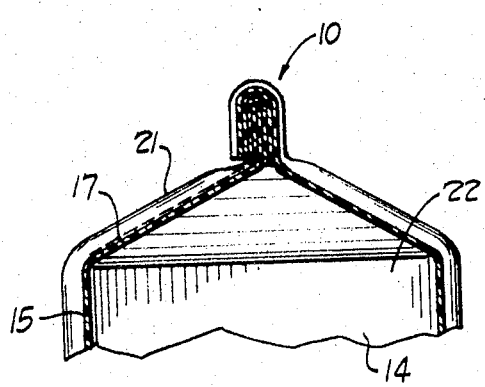
FIGURE 3 is a cross-sectional view of the container of FIGURE 1 and taken along the plane of line 3—3 of FIGURE 1.
Figure 5:
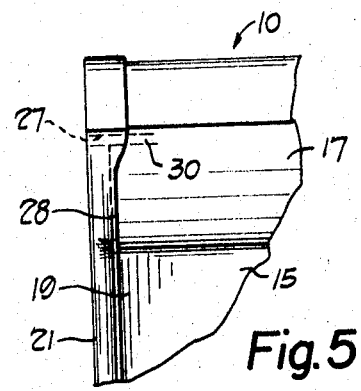
FIGURE 5 is a fragmentary elevational view of the top portion of the container.

As shown in FIGURES 1 and 2, rib 19 has a lower terminal portion 26 which terminates above the bottom 16 of the container, thereby defining passage 25 between the tubular member 21 and the interior 22 of the container 10. In forming lengths of plastic tubing into a plurality of plastic container forming portions by the method described in the second application mentioned above, the rib forming sealing means may skip along one rib and tubular forming side to form fluid passages 25.

Top portion 17 is provided with perpendicular score lines 27, 28, for enabling the consumer to detach one end of straw forming tube 21 and simultaneously open an air inlet to the fluid. Line 27 extends transversely through and beyond rib 19. Line 28 extends longitudinally of and preferably bisects rib 19. When the consumer pulls at the upper portion of tube 21, it separates from the container 10 and defines a suction straw. Separation of the upper end of tube 21 from container 10 simultaneously opens an air passage into container 10 at the inner terminal portion 30 of score line 27.

In the preferred embodiment, the containers of this invention are initially formed, as by extrusion, into a continuous length or strip of plastic sheet or film material consisting of a plurality of container forming portions in end to end relationship that may be rolled or folded for subsequent shipment. At least two of the external ribs and integral tubular members are formed on opposite sides of the container forming portions as by passing between two pairs of heated rollers. The continuous length of container forming portions or blanks in roll or folded form may be subsequently fabricated by the dairy wherein the remaining, if needed, ribs and tubular members are formed and the container forming portions are separated in conventional manner and subsequently formed into the finished container for filling.

It can be seen from the foregoing that the container of this invention provides integral straw means for consuming the contents. Preferably, the container is provided with score lines wherein detachment of one end of the straw means simultaneously provides an entrance for air. It is apparent that various modifications may be made in the container of this invention without departing from the spirit and scope of the appended claims.

I claim:
1. A thin-walled plastic container comprising a generally tubular body portion, top and bottom portions, said body portion having generally polygonal side panels, external ribs at the intersections of adjacent side panels, and a tubular member formed integrally with each of said external ribs, one of said tubular members being in open communication with the interior of the container near the bottom of the container, and means for disconnecting a portion of said one tubular member from said top portion to thereby define a drinking straw.

2. A thin-walled plastic container comprising a generally tubular body portion, top and bottom portions, said body portion having generally polygonal side panels, a tubular member formed from adjacent side panels at the intersection of said side panels and integral with the container, external ribs joining said tubular member to said adjacent side panels and separating the interior of said tubular member from the interior of said container, one of said external ribs having an opening providing open communication between the container and the tubular member adjacent said rib, said opening being near the bottom of the container, means on the top of the container for providing an air inlet in said top and to permit separation of a portion of said tubular member from said top portion of said container.

3. A thin-walled plastic container according to claim 1 wherein said means comprises a score line on said rib to permit separation of a portion of said one tubular member from said rib.

4. A thin-walled plastic container according to claim 3 wherein said container top portion is provided with removable tab means for providing an opening in the top of said container.

5. A thin-walled plastic container according to claim 3 wherein the score line extends beyond the rib to define an air inlet to said container when said tab is removed.

6. A plurality of thin-walled plastic container forming portions in continuous form, said container forming portions having a generally tubular body portion, top and bottom forming portions, said body portion having generally polygonal side panels, external ribs at the intersections of adjacent side panels, and a tubular member formed integrally with each of said external ribs, one of said tubular members being in open communication with the interior of said container forming portions near the bottom forming portion, and means for disconnecting a portion of said one tubular member to thereby define a drinking straw.

References Cited

UNITED STATES PATENTS 3,164,695  1/1965  Sanni.

FOREIGN PATENTS 670,982  4/1952  Great Britain.
620,232  10/1961  Italy.

DAVID M. BOCKENEK, Primary Examiner

U.S. Cl. X.R.
229—17, 37